Figure 4:
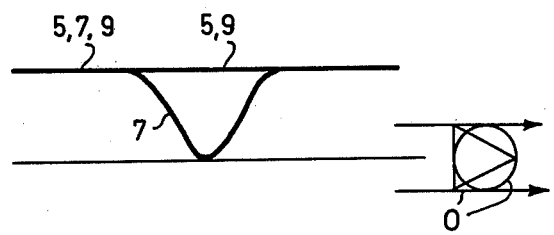

United States Patent [19]
van den Berg

[11] 3,952,149
[45] Apr. 20, 1976

[54] TELEVISION APPARATUS SUITABLE FOR VIDEO SIGNAL ANALYSIS

[75] Inventor: Wouter van den Berg, Eindhoven, Netherlands

[73] Assignee: U.S. Philips Corporation, New York, N.Y.

[22] Filed: Sept. 20, 1974

[21] Appl. No.: 507,680

[30] Foreign Application Priority Data
Apr. 1, 1974 Netherlands ................... 7404361

[52] U.S. Cl. .................... 178/6.8; 178/7.7; 178/DIG. 36
[51] Int. Cl.² ........................................ H04N 7/18
[58] Field of Search ............. 178/7.7, 6.8, DIG. 6, 178/DIG. 36

[56] References Cited
UNITED STATES PATENTS

| | | |
|---|---|---|
| 3,491,200 | 1/1970 | Wisnieff .................... 178/7.7 |
| 3,612,761 | 10/1971 | Wolff ....................... 178/6.8 |
| 3,654,386 | 4/1972 | Baum ................... 178/DIG. 6 |
| 3,699,244 | 10/1972 | Cohen .................. 178/DIG. 35 |
| 3,739,091 | 6/1973 | Kurasawa .................... 178/6.8 |

*Primary Examiner*—Howard W. Britton
*Attorney, Agent, or Firm*—Frank R. Trifari; Henry I. Steckler

[57] ABSTRACT

A television apparatus for video signal analysis has a camera tube in which, with the aid of a step-shaped deflection signal, a shift of a line scanning raster in the field scan direction is possible over a part of the width of a scanning line. Objects having a height in the order of the width of the scanning line can be analyzed by applying the information of the moving scanning line to a display device in which the value of the video signal is vertically displayed.

4 Claims, 8 Drawing Figures

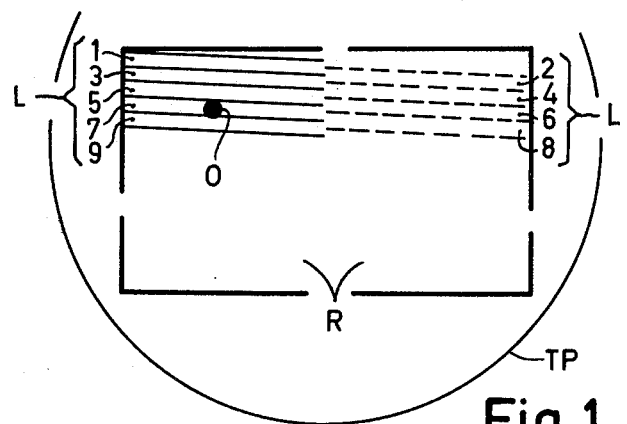
Fig. 1
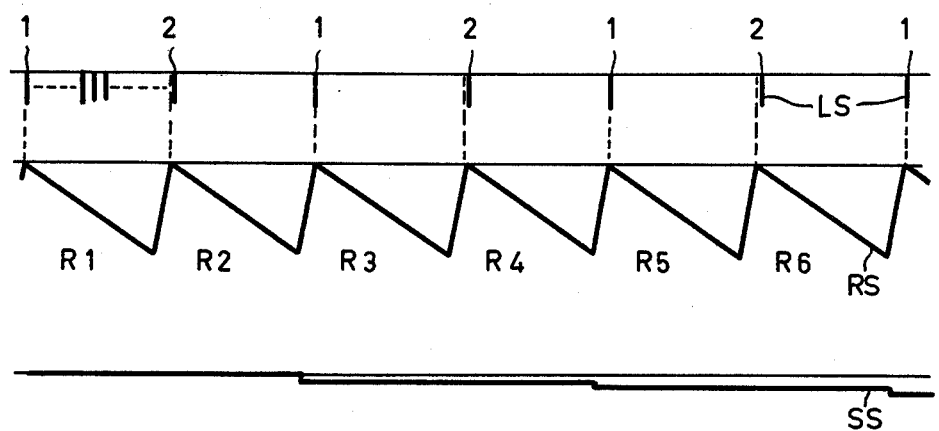
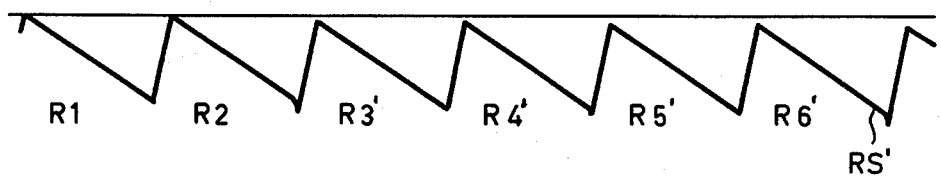
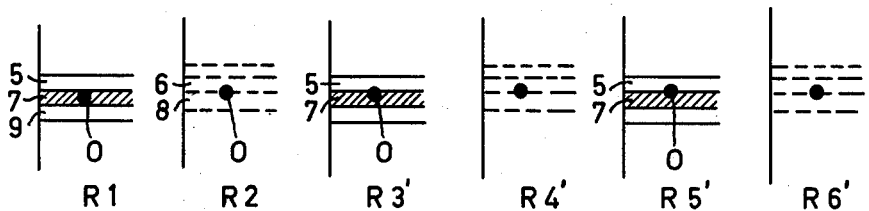
Fig. 2
Fig. 3

TELEVISION APPARATUS SUITABLE FOR VIDEO SIGNAL ANALYSIS

The invention relates to television apparatus suitable for video signal analysis, formed with a line and field deflection circuit connected to deflection means for an electron beam present in the apparatus, said circuits being formed for generating sawtooth-shaped deflection signals in the deflection means in order to constitute a line scanning raster in line periods and a field period.

Such television apparatus formed as a display apparatus is known from U.S. Pat. No. 3,491,200. This specification states that for obtaining a local definition improvement in a displayed image it is possible to effect the line and/or field scanning upon display with a saw-tooth-shaped signal having less steep slope than is normally the case. Here the lowest possible field frequency is used as a starting point, while for preventing smears behind moving parts in a displayed scene only a displacement of the moving part in a field period over at most one picture element may take place. The use of the described scanning method gives an optionally adjustable definition improvement for the same determined band width for the video signal so that an improved video signal analysis upon display can be carried out.

An object of the invention is to obtain an improved video signal definition when carrying out a signal analysis, but is specifically directed to objects occurring in a scene, image or object to be picked up with a format having the size of the width of the scanning lines. To this end the arrangement according to the invention is characterized in that the field deflection circuit is present in a television pick-up device and is formed with a signal generator supplying a step-shaped signal, which generator is connected to the field deflection means, a signal variation in the step-shaped signal occurring once during at least a field period and having such a value that the line scanning raster only moves over a part of the width of a scanning line.

Figure 5:
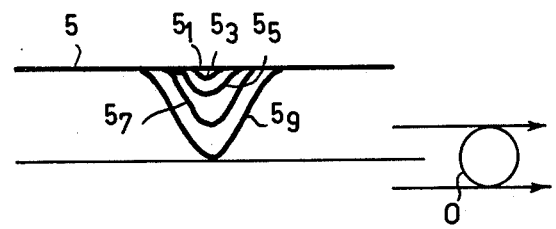
Figure 6:
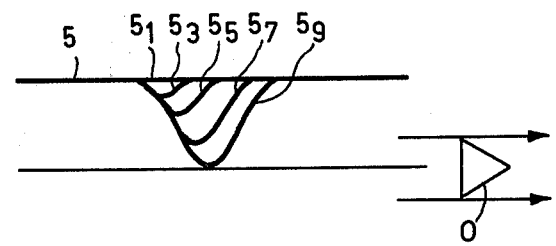
Figure 7:
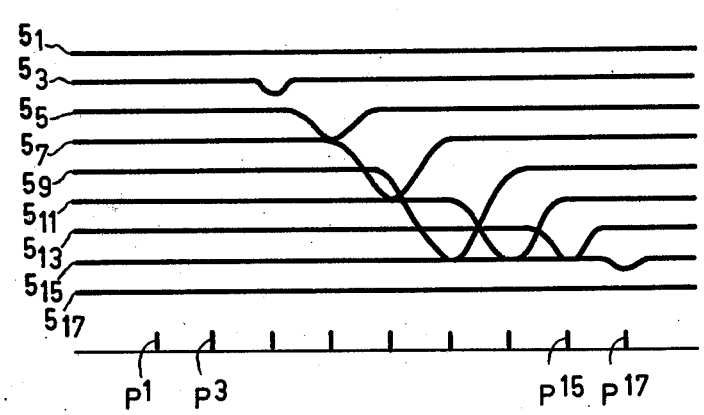
Figure 8:
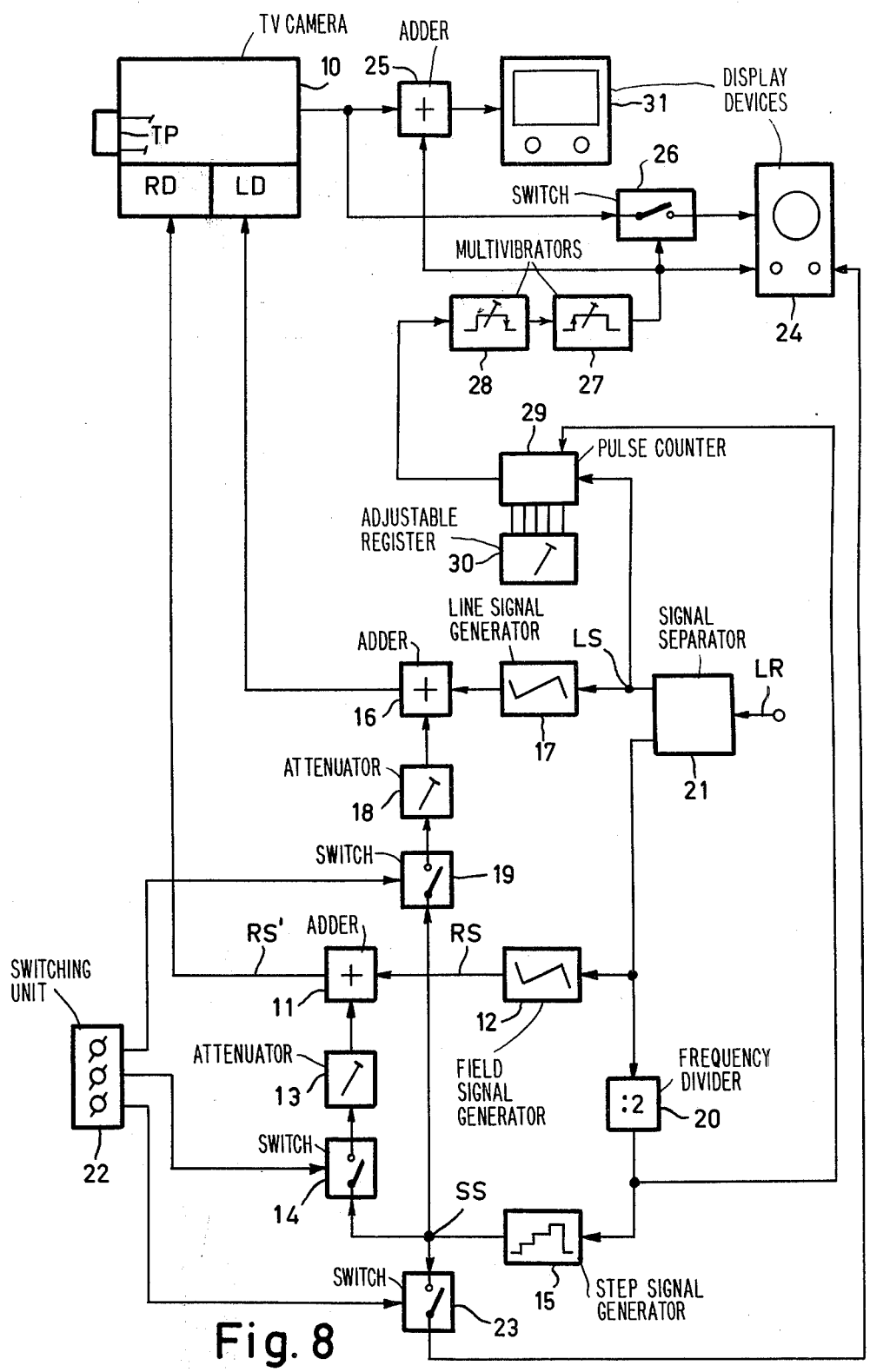

The invention will be described in greater detail by way of example with reference to the following figures in which FIG. 1 shows line scanning rasters as occur in an interlaced form in television, FIG. 2 shows some signals as a function of time, FIG. 3 shows a part of the line scanning rasters according to FIG. 1 in which an object to be analyzed is shown, FIGS. 4, 5 and 6 show some video signals to be analyzed as a function of place and time, FIG. 7 is a graphic representation of the video signal to be analysed of FIG. 5 when using a specific display device and, FIG. 8 shows a block diagram of an embodiment of a television apparatus according to the invention.

FIG. 1 diagrammatically shows two interlaced line scanning rasters R with odd scanning lines L 1, 3, 5, 7, 9, . . . and even scanning lines L 2, 4, 6, 8, . . . as normally occur in interlaced television. The line scanning rasters R are formed, for example, on a so-called target TP of a television pick-up tube of the vidicon type (not shown) by an electron beam generated in the pick-up tube and being deflected under the influence of line and field deflection means and scanning the target TP. To this end the deflection means, which are active in an electro-magnetic or electrostatic manner, are connected to a line or field deflection circuit. Furthermore focussing means are present which together with the pick-up tube, the deflection means, etc., constitute a television pick-up device not further shown. The light coming from a scene, image or object to be picked up is projected onto the target TP consisting of a transparent electrically conducting signal plate and a semiconductor layer. The signal plate is connected through a resistor to a supply source and the photons of the light cause a place-dependent leakage in the semi-conductor layer so that a potential image which corresponds to the scene, the image or the object, is formed on its free surface. The electron beam scanning the target TP provides a current due to the charge neutralization in the potential image through the resistor connected to the signal plate. The voltage drop across this resistor results in the video signal which corresponds to the scene to be picked up.

FIG. 1 shows the line scanning rasters R with the odd lines L1, 3, 5, . . . and the even lines L 2, 4, 6, . . . as they occur in practice on the target TP of a television pick-up tube. It is found that during scanning in one and the other line scanning raster R there is no space between the successive line scans 1, 3, 5, . . . and 2, 4, 6, . . . Consequently, the effective light integration time in the semi-conductor layer, which is equal to the time difference between two successive scans of a spot, is equal to a field period. If there had been spaces between the successive scanning lines L of a line scanning raster R, the theoretically possible light integration time of two field periods, i.e., one picture period would have applied for these spaces.

FIG. 1 furthermore shows by means of the reference O an object which occurs in the potential image on the target TP. The object O may occur, for example, in the scene to be picked up, but may alternatively be the result of an error occurring on the target TP itself. It is possible that the target TP is equally exposed and the pick-up tube is checked on the occurrence of errors. Furthermore the pick-up device may pick up an object such as an electrical circuit integrated in a semiconductor body or such a circuit provided in printed form on a plate. For all cases there applies that the object O has a format which falls within the width of the scanning lines L (in FIG. 1 scanning line 7) and gives a contribution in the video signal which upon display or signal analysis is insufficient to check the shape of the object O. For the purpose of illustration reference is made to FIG. 1 and FIG. 4 in which the lines 5 and 9 give no information at all and line 7 gives insufficient information about the shape of the object O which may be, for example, circular or triangular or may have another shape.

FIG. 4 shows the image on a display device not shown which has a time base synchronized with the line synchronizing pulses in the signal LS of FIG. 2, while the video signal values are represented transversely to the time base. Such a display device may be, for example, a normal oscilloscope to which the information from the lines 5, 7 and 9 occurring during each picture is repeatedly applied. The presistence of the oscilloscope screen must be sufficiently large to avoid troublesome picture frequency flickering phenomena. Furthermore it is possible to use an oscilloscope combined with a store so that a single supply of the subsequently stored line information is sufficient. The storage operation may alternatively be given by a very long persistence of the fluorescent coating on the display screen. The representation of FIG. 4 and of FIGS. 5, 6 and 7 to be further described hereinafter has been given for the purpose of illustration and is only shown diagrammatically.

To realize according to the invention that an analysis of the shape of the object O is possible with a format within the scanning line width, the signals shown in FIG. 2 are used. FIG. 2 shows a pulsatory line synchronizing signal LS and a sawtooth-shaped field deflection signal RS. The references R1, R3 and R5 show some line scanning rasters R with odd lines of which only the synchronizing pulse of the first line 1 is further shown which pulse coincides with the commencement of a field scanning. The references R2, R4 and R6 show some line scanning rasters R with even lines and the synchronizing pulse of line 2 is shown which pulse occurs half a line period after the commencement of the field scanning. The signals LS and RS result in the line scanning rasters as shown in FIG. 1 on the target TP when they occur in the line and field deflection circuits. According to the invention a step-shaped signal SS is applied to the field deflection circuit which together with the sawtooth-shaped deflection signal RS results in a changed field deflection signal RS′: in the signal RS′ the deflection signal in the rasters R1 and R2 is unchanged and is changed in the rasters R3′, R4′, R5′, etc.

The result of using the changed field deflection signal RS′ is apparent from FIG. 3. The reference R1 in FIG. 3 shows part of the line scanning raster R of FIG. 1 in which the object O occurs on the scanning line 7. The reference R2 of FIG. 3 shows how the object O in the even line scanning raster R2 of FIG. 2 occurs in the lines 6 and 8. By using the step-shaped signal Ss of FIG. 2 the lines 5 and 7 (and the other lines) in the odd scanning raster R3′ of FIG. 3 are shifted in the field scanning direction so that part of the object O occurs in the scanning line 5. In the odd scanning raster R5′ of FIG. 3 a further displacement is obtained. The same displacement is present in the rasters R4′ and R6′ of FIG. 3, but since it is sufficient for signal analysis to consider a signal line L per picture instead of per scanning raster R, the even rasters are further left out of consideration.

It is found that with the aid of the step-shaped signal SS the scanning rasters R1, R3′, R5′, etc., of FIG. 3 undergo a displacement in the field scanning direction in parts of the width of the scanning lines. To illustrate the effect reference is made to FIG. 5. In FIG. 5 the video signal corresponding to the scanning line 5 of the raster R1 in FIG. 3 is denoted by $5_1$. A video signal $5_3$ is associated with R3′ in FIG. 3 and so forth for the video signals $5_5$, $5_7$ and $5_9$. The video signal $5_9$ occurs when the object O of FIG. 5 lies completely within the width of the scanning line 5 shifted over one line width. After the video signal $5_9$ signals $5_{11} = 5_7, 5_{13} = 5_5, 5_{15} = 5_3$ and $5_{17} = 5_1$ occurs assuming the object O of FIG. 5 being symmetrical relative to the line scanning direction.

For the purpose of comparison with FIG. 5, FIG. 6 shows an object O which is triangular. The leading edges of the video signals $5_3$, $5_5$, $5_7$ and $5_9$ coincide. Here, too, there applies that for an object O which is symmetrical relative to the line scanning direction there occur signals $5_{11} = 5_7, 5_{13} = 5_5, 5_{15} = 5_3$ and $5_{17} = 5_1$.

FIGS. 5 and 6 show the information of the displaced line 5 on the display screen of, for example, an oscilloscope in cooperation with a store. The information of the displaced line 5 in the (odd) first, third, fifth, etc., raster is stored in the store and subsequently read out sufficiently quickly so as not to obtain the troublesome flickering phenomenon upon the sequential display on the display screen of the oscilloscope as a display device. Furthermore the store may be present in the fluorescent coating of the oscilloscope itself so that after a single recording the curves remain observable.

For an asymmetry of the objects O of FIGS. 5 and 6 relative to the line scanning direction the result is that the signals previously given as being identical are different. As a result six displaced lines occur in the display device instead of the three double-displayed lines with information ($5_5$, $5_7$, $5_9$) which gives a confusing image. A solution to this problem is the display method as shown in FIG. 7. FIG. 7 shows the signals of FIG. 5 ($5_1$, $5_3$, ... $5_{17}$) as may occur, for example, in a printing device as display device. Not only has the information of each displaced and displayed line 5 been shown in a separate track, but for further clarification the tracks are shifted relatively to each other at a reasonable distance between the tracks. This may be effected by providing a signal generator for the television pick-up device which generator applies a step-shaped deflection signal to the line deflection means. Not only does the described displacement occur in the field scanning direction, but also in the line scanning direction. Pulses corresponding to such a displacement are denoted by P1, P3, ... P15, P17 in FIG. 7. Instead of the introduction of the displacement into the line scanning direction in the television pick up device, it might alternatively be introduced in the printing device. Here there is the drawback of a necessary adaptation of the printing device. It is more advantageous to utilize the television pick-up device, which is already modified for the displacement in the field scanning direction, for the displacement in the line scanning direction.

The possibly asymmetrical shape of the object O can be determined in a simple manner from FIG. 7 with the information of the displaced lines $5_3$ ... $5_{15}$ present therein. Due to the displacement in the line scanning direction, i.e., the track direction, the shape can easily be determined also for small distance between the tracks. It stands to reason that the displacement in the line scanning direction is not necessary for a track distance which is so large that the maximum video signal value remains within this distance upon display.

The starting point in the described examples is a television system using two interlaced line scan rasters corresponding to one picture. For the described video signal analysis one displaced line L of a number of odd or even rasters is used which number depends on the magnitude of the displacement relative to the scanning line width. In FIGS. 5, 6 and 7 eight displacements occur between the information of the lines $5_1$ and $5_{17}$, which means that a cycle of eight picture periods is used for signal analysis. When using a non-interlaced television system successive line scanning rasters may each be utilized for the displacement and signal analysis. In that case six signal variations would occur in the step-shaped signal SS of FIG. 2; one in each field period. The three signal variations shown in the step-shaped signal SS of FIG. 2 are represented as occurring at the commencement of the field blanking and field flyback periods. This is not essential. The only thing which is important is that before scanning the line to be analyzed, the displacement in the field scan direction has taken place. In known manners the information of the line to be analyzed can be derived from the video signal by counting, for example, from the commencement of a field period the line synchronizing pulses until the desired line is reached. Furthermore a certain section of the relevant line can be chosen in a simple manner with the aid of an adjustable monostable multivibrator activated by the line synchronizing pulse for determining the instant of commencement, followed by a second monostable multivibrator determining the duration of the line section to be analyzed.

FIG. 8 shows an embodiment of a television apparatus according to the invention. The reference numeral 10 denotes a television pick-up device in which the reference RD denotes field deflection means, LD line deflection means and TP the target described with reference to FIG. 1 of a television pick-up tube not further shown. The field deflection means RD are connected for the purpose of supply of a field deflection signal to the output of an adder stage 11 an input of which is connected to a signal generator 12 supplying a sawtooth-shaped signal at the field frequency and another input of which is connected through an adjustable signal amplifier or attenuator 13 and a switch 14 in series to a signal generator 15 supplying a step-shaped signal. The line deflection means LD are coupled in a corresponding manner to an adder stage 16, a line-frequency sawtooth signal generator 17, an adjustable signal amplifier or attenuator 18, a switch 19 and the signal generator 15 with the step-shaped signal. Thus a field deflection circuit (11–15) and a line deflection circuit (15–19) are formed.

The generator 15 is connected through a frequency divider 20 with a division factor of two to an output of a signal separator 21 to which the generator 12 is directly connected. The generator 17 is connected to another output of the signal separator 21. A composite synchronizing signal LR is applied to the signal separator 21, which signal includes field and line synchronizing pulses and equalizing pulses commonly used in interlaced television. The signal separator 21 splits up the composite signal LR into the line synchronizing signal LS of FIG. 2 for supply to the generator 17 and into a field synchronizing signal which is directly applied to the generator 12 supplying the field deflection signal RS of FIG. 2. The field synchronizing signal is applied through the frequency divider 20 to the generator 15 which supplies the step-shaped signal SS of FIG. 2 at the picture frequency. Instead of the composite signal LR, separate line and field synchronizing signals might alternatively be used.

The switches 14 and 19 are optionally operated from a switching unit 22 which is furthermore connected to a switch 23. The switch 23 is provided between the generator 15 and a display device 24. The display device 24 in FIG. 8 is shown as an oscilloscope to which for purposes to be described hereinafter the signal SS may optionally be applied.

The video signal output of the pick-up device 10 is connected to an adder stage 25 and a switch 26 through which a connection is provided to an input of the display device 24. The switch 26 is connected for automatic operation to a series arrangement of two multivibrators 27 and 28 and a pulse counter 29 to which for the purpose of pulse counting the line synchronizing signal LS and for the purpose of resetting the picture frequency signal from the frequency divider 20 are applied. The outputs of an adjustable register 30 are connected to the pulse counter 29. The operation of the pulse counter 29 and the register 30 combined is such that the pulse counter 29 supplies a single pulse when the number of pulses counted by the counter 29 after resetting is equal to a number chosen in the register 30. The pulse counter 29 and the register 30 are thus active as a line selector which selects one line per picture period.

The two monostable multivibrators 28 and 27 which are adjustable in duration follow the pulse counter 29. The multivibrator 28 determines during the selected line period with its reset edge the instant when the multivibrator 27 closes the switch 26 with its pulse, which multivibrator 27 maintains the switch 26 closed during its own adjustable pulse time. Furthermore the output of the multivibrator 27 is connected to the adder stage 25 and for synchronizing or trigger purposes is connected to the display device 24. The result is that the display device 24 receives the trigger signal for its time base deflection from the multivibrator 27 and through the switch 26 the video information of part of the chosen line to be analyzed and displayed.

For normal television display the pick-up device 10 is connected through the adder stage 25 to a television display apparatus 31 to which a composite video signal is applied. The operation of the generator 15 with the step-shaped signal becomes manifest in normal television display by a visible displacement of the line scanning raster in the field scanning direction over a width of two lines. The use of the adder stage 25 causes the multivibrator 27 in the television picture on the display device 31 to give an indication which displacing line is chosen with the aid of the register 30 and which line section thereof is chosen for analysis with the aid of the multivibrator 28. The multivibrator 27 determines the size of the line section which is visible, for example, as a black or a grey line section with a picture frequency flicker.

In the position shown in FIG. 8 with only the switch 14 closed the display device 24 displays a picture as shown in FIGS. 5 and 6. Closing of the switch 19 has the result that in case of the displacement in the field scan direction the displacement described with reference to FIG. 7 with the pulses P1, P3, . . . P15, P17 occurs in the line scan direction. By subsequent closure of the switch 23 the display device 24 receives the step-shaped signal SS. The signal SS gives per picture period a downward displacement of the time base of the display device 24 so that the picture of FIG. 7 appears on the display screen.

Instead of the oscilloscope embodiment of the display device 24 shown in FIG. 8 many other embodiments are possible. A printing device in which a laser beam writes on a metal foil that can be burnt away may be used. The use of a slower printing device which cannot instantaneously process the information supplied in a short time of, for example, several hundred nanoseconds is possible if use is made of a signal sampling and hold technique. The information of a given shifted line is repeatedly generated for a number of picture periods and signal samples shifted in time (place) are taken by means of a signal sample and hold circuit and retained during the required processing time in the display device. After the required number of picture periods for processing the information of the line a further shift in the field scan direction is given and a subsequent signal sampling is effected.

For a video signal analysis to be performed automatically an analysis to be performed digitally may be considered. In this case, for example, a line occurring in a group of lines, is taken for analysis. The optionally adjusted part of the line to be analyzed, for example, of the line 1 in a group of lines 1, 3, 5 and 7 has, for example, the information zero in the (stationary) initial state. The adjusted part of the group of lines constitutes a window of lines in the total picture of the line raster. When subsequently shifting the line 1 in the stationary adjusted window, the deviations in the information zero are converted into numbers by way of samples and stored. After the line 1 has been shifted so far that it has reached the original position of the line 7, an analysis of the stored numbers is effected calculated in both the field and line scan directions so that the shape of the object is determined. In this case it is possible to adjust a threshold value for an admitted maximum object diameter on the one hand and an admitted maximum deviation of the video signal value on the other hand above which signalizing in the device is effected. An automatic check-up of the object is obtained after the said line window is adjusted at the area of the object.

I claim:

1. Television apparatus suitable for video signal analysis comprising line and field deflection circuits, said circuits generating sawtooth-shaped deflection signals in order to constitute a line scanning raster in line periods and a field period, the field deflection circuit comprising a signal generator means for supplying a step-shaped signal having a variation occuring once during at least one field period and an amplitude wherein the line scanning raster only moves over a part of the width of a scanning line.

2. Television apparatus as claimed in claim 1, wherein a signal variation in the step-shaped signal occurs once during two field periods of two successive line scanning rasters corresponding to an interlaced picture in the pick-up device.

3. Television apparatus as claimed in claim 1, further comprising a television pick-up device having line and field deflection means coupled to said deflection circuits, a display device coupled to said pick-up device and having a time base which is synchronized with the line scanning in the pick-up device and in which perpendicular to the time base the video signal value is displayed, and means for effecting said display only for a single line over each line scanning raster or over two interlaced line scanning rasters of the video signal which is generated under the control of the step-shaped signal originating from said signal generator.

4. Television apparatus as claimed in claim 3, wherein the line deflection circuit includes a signal generator means for supplying a step-shaped deflection signal and is coupled to the line deflection means, said deflection signal having for each line scanning raster or for a plurality of line scanning rasters a signal variation wherein upon display by means of said display device the information of the signal line is moved in the field and line scan directions.

* * * * *